United States Patent [19]

Eidsmore

[11] 4,157,808
[45] Jun. 12, 1979

[54] PRECISION FLOW CONTROLLER

[75] Inventor: Alva A. Eidsmore, Santa Cruz, Calif.

[73] Assignee: Integrated Flow Systems, Inc., Sunnyvale, Calif.

[21] Appl. No.: 851,476

[22] Filed: Nov. 14, 1977

[51] Int. Cl.² .............................................. F16K 47/04
[52] U.S. Cl. .............................. 251/205; 251/335 A; 251/121
[58] Field of Search .............. 251/205, 335 A, 335 B, 251/121

[56] References Cited

U.S. PATENT DOCUMENTS

| | | | |
|---|---|---|---|
| 1,385,681 | 7/1921 | Hammond | 251/335 A |
| 2,675,204 | 4/1954 | Johnson | 251/335 A |
| 2,980,392 | 4/1961 | Greenwood | 251/205 X |
| 3,511,470 | 5/1970 | Beckett et al. | 251/121 |
| 3,557,833 | 1/1971 | Gilmont | 251/205 X |
| 3,985,336 | 10/1976 | Bentley | 251/205 |

Primary Examiner—Arnold Rosenthal
Attorney, Agent, or Firm—A. C. Smith

[57] ABSTRACT

An improved flow-controlling mechanism utilizes interference-fitting components and static seals to assure accurate and repeatable fluid flow-controlling settings and to eliminate a leakage deteriorating seals.

8 Claims, 2 Drawing Figures

PRECISION FLOW CONTROLLER

BACKGROUND & SUMMARY OF THE INVENTION

Fluid-flow controlling valves commonly rely on the force exerted by a resilient member against a valve seat to control the flow of fluid through the resulting aperture. The flow-controlling force is usually established by a jack-screw arrangement of a rotating shaft within the valve body. One disadvantage of a flow controller of this type is that the rotating shaft has to be sealed against leakage where the rotating shaft protrudes through the valve body. Where such a valve controls pervasive or corrosive fluids, such a dynamic seal can deteriorate and destroy the integrity of the fluid system.

In accordance with the present invention, a pair of mating valve members are arranged to cooperate via interference fit to control fluid flow therethrough with high precision and repeatability of setting. In addition, an integral member provides static seal of fluid within the flow controller as the two valve members undergo relative movement. This assures more reliable bilateral flow control than is possible with conventional valves.

DESCRIPTION OF THE PREFERRED EMBODIMENT

Figure 1:
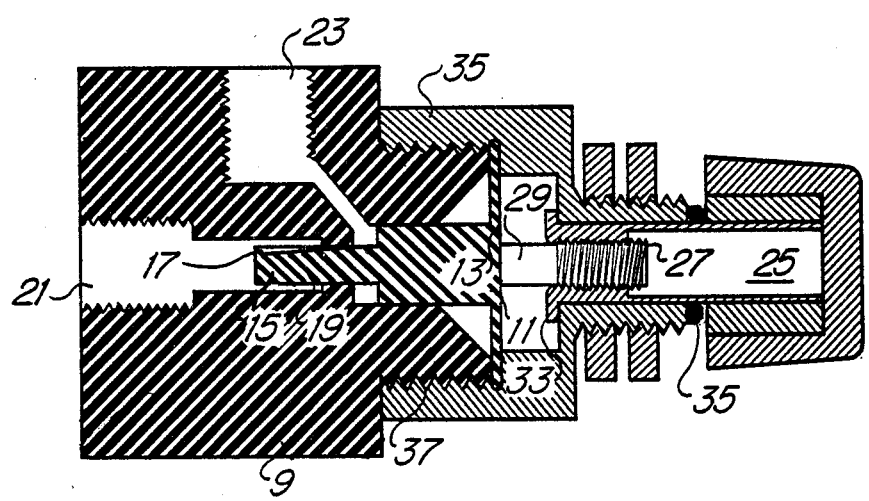
FIG. 1 is a sectional view of one embodiment of the assembled flow controller according to the present invention.

Referring now to FIG. 1, there is shown a sectional view of one embodiment of the present invention. The present flow controller includes the body 9 and stem 11 and integral diaphragm 13 which are generally cylindrical in shape (not shown) and which are formed of a resilient, deformable material such as tetrafluroethylene resin known as TEFLON supplied by DuPont Company. The inner stem 15 of cylindrical shape engages the cylindrical aperture 19 in the body 9 in interference-fitting fashion, i.e. the diameter of the inner stem 15 is larger than the diameter of the aperture 19. However, since the body 9 is also formed of a resilient, deformable material such as tetrafluroethylene resin (e.g. TEFLON), the two members conveniently slide one within the other to establish a positive fluid seal. The flow controlling properties of these two members is established by a tapered groove 17 formed longitudinally within the wall of the inner stem 15, as illustrated. Thus, fluid under pressure can pass only through the groove 17 from one side of the seal to the other, and the volume of fluid under pressure per unit time that passes through the flow controller is determined by the length of the tapered groove 17 which protrudes out of aperture 19. Fluid may thus flow in either direction between parts 21 and 23 with comparable precision and flow characteristics.

The length of groove 17 which protrudes from aperture 19 is determined by the rotation of the threaded knob insert 25 relative to the members 9 and 11. The mating threads 27 are carried on plunger 29 which is rigidly attached to the member 11. Thus, rotation of the knob and insert 25 relative to the plunger 29 converts this rotational motion into translational motion of the stem 15 and groove 17 into and out of the aperture 19. Suitable thrust bearing arrangements on the knob and insert 25 including flange 31 and retaining ring 33 assure that the translational movement of the plunger 29 is proportional to the rotation of the knob and insert 25.

The diaphragm 13 which is integrally formed on the valve member 11 is clamped around its outer periphery against the body 9 by the outer housing member 35 which is threaded 37 into engagement with the body 9. This provides a permanent, static seal of fluids within the body 9 and also holds the stem 15 and plunger 29 attached thereto against rotation with the knob and insert 25. This diaphragm is sufficiently thin and flexible to allow the plunger 29 and stem 11 and inner stem 15 to move translationally in and out of the aperture 19 without altering or affecting the fluid seal provided thereby.

Figure 2:
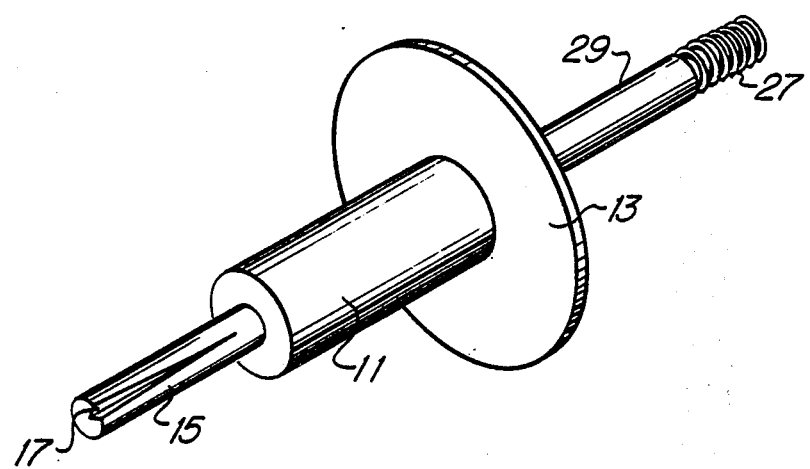
FIG. 2 is a perspective view of the valve stem assembly of the embodiment of FIG. 1.

Referring now to the perspective view of FIG. 2, there is shown the generally cylindrical shape of the valve member including stem 11 and inner stem 15 and diaphragm 13, all formed as an integral structure of a material such as TEFLON. The plunger 29 is rigidly attached to the stem 11 so that it cannot rotate with respect thereto. The tapered groove 17 longitudinally oriented along the surface of the inner stem 19 provides the varying orifice for fluid flow therethrough as a function of translational movement of the member within the aperture 19. The diameter of the stem 11 may be selected to provide close-tolerance fit rather than inteference fit within the aperture 19 to serve as an alignment guide with the body.

I claim:

1. Flow-controlling apparatus comprising:
   a valve body having a pair of fluid ports spaced apart therewithin and having an aperture of selected diameter communicating with the fluid ports;
   a valve stem disposed to fit within said aperture and having a dimesion larger than the selected dimension of said aperture of at least one of said valve body and valve stem being formed of a deformable, resilient material to facilitate interference fit of the valve stem within the aperture; said valve stem having a groove in the surface thereof which tapers in cross section with length along the valve stem;
   a radially-extending flange on said valve stem forming a flexible diaphragm;
   housing means disposed to clamp the outer periphery of said flange against the valve body to form a fluid-tight seal therewith and to clamp the flange against rotation relative to the valve body;
   means coupled to the valve stem for selectively altering the translational position thereof within said aperture.

2. Flow-controlling appartus as in claim 1 wherein said valve stem is formed of TEFLON.

3. Flow-controlling apparatus as in claim 1 wherein the valve body and the valve stem are each formed of a deformable resilient material to facilitate interference fit of the valve stem within the aperture.

4. Flow-controlling apparatus as in claim 3 wherein the valve body and valve stem are formed of TEFLON.

5. Flow-controlling apparatus as in claim 1 wherein the radially-extending flange is integrally formed on the valve stem near an end thereof remote from the groove.

6. Flow-controlling apparatus as in claim 5 wherein the valve stem and flange are formed of TEFLON.

7. Flow-controlling apparatus as in claim 1 wherein:
   said means includes a plunger attached to said stem and including a threaded portion thereon; and manually rotatable knob means rotatably mounted with respect to the valve body and having a threaded portion engaged with the threaded portion on said plunger for translating the plunger and the valve stem attached thereto in response to rotation of the knob means.

8. Flow-controlling apparatus as in claim 1 comprising stem means integrally formed intermediate the valve stem and flange and having a selected outer dimension;

and said valve body includes an opening therein aligned with said aperture and having a dimension slightly greater than the selected outer dimension of the stem means to provide a guide for translational movement of the stem means therewithin.

* * * * *